(12) United States Patent
Watanabe

(10) Patent No.: US 7,952,754 B2
(45) Date of Patent: May 31, 2011

(54) PRINT DATA GENERATING APPARATUS AND COMPUTER USABLE MEDIUM THEREFORE CAPABLE OF CREATING PRINT DATA SUITABLE FOR PRINTING A BACKGROUND COLOR OF AN OBJECT TO BE PRINTED IN A PRINTING APPARATUS

(75) Inventor: Takeshi Watanabe, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1119 days.

(21) Appl. No.: 11/714,838

(22) Filed: Mar. 7, 2007

(65) Prior Publication Data

US 2007/0216921 A1    Sep. 20, 2007

(30) Foreign Application Priority Data

Mar. 20, 2006  (JP) .................................. 2006-077720

(51) Int. Cl.
*G06K 1/00* (2006.01)
*G06K 15/00* (2006.01)
*G03G 15/01* (2006.01)

(52) U.S. Cl. ........ 358/1.9; 358/1.16; 358/1.2; 358/1.14; 399/54

(58) Field of Classification Search ................... 358/1.9, 358/1.16, 1.2, 1.14, 501, 504; 399/28, 45, 399/53, 54; 347/14, 15, 43, 98
See application file for complete search history.

(56) References Cited

U.S. PATENT DOCUMENTS

2006/0044346 A1* 3/2006 Hakamada ...................... 347/43

FOREIGN PATENT DOCUMENTS

| JP | A-09-134159 | 5/1997 |
| JP | A-09-149276 | 6/1997 |

* cited by examiner

*Primary Examiner* — Thomas J Lett
(74) *Attorney, Agent, or Firm* — Oliff & Berridge, PLC

(57) ABSTRACT

A print data generating apparatus, comprising a background color designating system, wherein at least one background color of pixels in a background area of the image to be printed is designated, a usable color designating system, wherein a color to be used to print the at least one background color of the pixels is designated among a plurality of color options including a transparent color and a specific color, a color substituting system, wherein color information of the at least one background color is substituted with color information of the color designated in the usable color designating system, and a print data creating system, in which print data to be used for printing is created based on the image data wherein the color information of the at least one background color is substituted with the color designated in the usable color designating system in the color substituting system, is provided.

9 Claims, 10 Drawing Sheets

410

| COLOR CONVERSION TABLE ||||||| 
| sRGB VALUE ||| CMYK VALUE ||||
| R | G | B | C | M | Y | K |
|---|---|---|---|---|---|---|
| 0 | 0 | 0 | 0 | 0 | 0 | 0 |
| 64 | 0 | 0 | 0 | 32 | 45 | 0 |
| 128 | 0 | 0 | 0 | 101 | 123 | 0 |
| 192 | 0 | 0 | 0 | 190 | 210 | 0 |
| 255 | 0 | 0 | 0 | 255 | 250 | 0 |
| 0 | 64 | 0 | 50 | 23 | 10 | 10 |
| 64 | 64 | 0 | 100 | 32 | 45 | 35 |
| 128 | 64 | 0 | 80 | 62 | 70 | 55 |
| 192 | 64 | 0 | 20 | 102 | 190 | 15 |
| 255 | 64 | 0 | 0 | 180 | 250 | 0 |
| ... | ... | ... | ... | ... | ... | ... |
| 0 | 192 | 255 | 255 | 20 | 0 | 0 |
| 64 | 192 | 255 | 190 | 21 | 0 | 0 |
| 128 | 192 | 255 | 128 | 31 | 0 | 0 |
| 192 | 192 | 255 | 54 | 25 | 0 | 0 |
| 255 | 192 | 255 | 0 | 20 | 0 | 0 |
| 0 | 255 | 255 | 255 | 10 | 0 | 0 |
| 64 | 255 | 255 | 198 | 2 | 0 | 0 |
| 128 | 255 | 255 | 130 | 0 | 0 | 0 |
| 192 | 255 | 255 | 55 | 0 | 0 | 0 |
| 255 | 255 | 255 | 0 | 0 | 0 | 0 |

| WHITE CONVERSION TABLE | | | |
|---|---|---|---|
| sRGB VALUE | | | WHITE CONVERSION TABLE |
| R | G | B | W VALUE |
| 0 | 0 | 0 | 0 |
| 64 | 0 | 0 | 30 |
| 128 | 0 | 0 | 100 |
| 192 | 0 | 0 | 150 |
| 255 | 0 | 0 | 255 |
| 0 | 64 | 0 | 32 |
| 64 | 64 | 0 | 120 |
| 128 | 64 | 0 | 145 |
| 192 | 64 | 0 | 180 |
| 255 | 64 | 0 | 255 |
| ... | ... | ... | ... |
| 0 | 192 | 255 | 250 |
| 64 | 192 | 255 | 251 |
| 128 | 192 | 255 | 253 |
| 192 | 192 | 255 | 254 |
| 255 | 192 | 255 | 255 |
| 0 | 255 | 255 | 255 |
| 64 | 255 | 255 | 251 |
| 128 | 255 | 255 | 245 |
| 192 | 255 | 255 | 250 |
| 255 | 255 | 255 | 255 |

FIG. 8

PRINT DATA GENERATING APPARATUS AND COMPUTER USABLE MEDIUM THEREFORE CAPABLE OF CREATING PRINT DATA SUITABLE FOR PRINTING A BACKGROUND COLOR OF AN OBJECT TO BE PRINTED IN A PRINTING APPARATUS

CROSS REFERENCE TO RELATED APPLICATION

This application claims priority from Japanese Patent Application No. 2006-077720, filed on Mar. 20, 2006, the entire subject matter of which is incorporated herein by reference.

BACKGROUND

1. Technical Field

Aspects of the present invention relate to a print data generating apparatus and print data generating programs therefor capable of creating print data which is used for printing in the printing apparatus, and more specifically, creating print data suitable for printing a background color of an object to be printed in the printing apparatus.

2. Related Art

Conventionally, in an inkjet printing apparatus that performs recording by ejecting inks onto a recording medium, the inks are ejected from ejecting nozzles, which are provided at an end of ink channels, by leading the inks from ink reservoirs to a plurality of ejecting channels in inkjet heads, and by selectively activating actuators (e.g., heating elements, piezoelectric elements, and the like). When an image is formed in colors, each of pixels composing the image is resolved, for example, into the three primary colors, which are cyan (C), magenta (M), and yellow (Y), then a colored pixel is formed as the inks adjusted in their densities are ejected onto the recording medium. Also, a pixel which contains black as a component is generally reproduced as a black (K) ink is ejected onto the recording medium. Further, in recent years, a printing apparatus wherein a white (W) ink is used in order to achieve an image with high reproducibility on the recording medium, when a ground color of the recording medium is a color other than white, is known.

Also conventionally, various techniques designed for processing a background color of an image during the time of image printing are known. An example of such techniques is disclosed in Japanese Patent Provisional Publication No. H 6-237374 (hereinafter referred to as "'374 publication"). In a picture processing unit in '374 publication, when a print control key is pressed and an image received therein is displayed in a display section, the image with its background color extracted is displayed. When an instruction for executing a printing operation is given, the image without the background color is printed. With this process, an unnecessary background color is prevented from being printed so that consumption of ink is decreased.

For another example, an overlay printing processing method is disclosed in Japanese Patent Provisional Publication No. 2000-163238 (hereinafter referred to as "'238 publication"). In this method, a binary raster image is dynamically produced as mask data based on shape data of the print data. Logical AND of each color component of the raster image data for overlaying and the mask data is obtained, and logical OR of the data undergoing the logical AND with the mask data and each color component of the raster image of the print data is obtained. Thus, accurately overlaid reverse character and diagram which has a same color as the background can be achieved.

Further, an example of a color printer, wherein a paper is colored in an arbitrary color without preparing a color paper, is disclosed in Japanese Patent Provisional Publication 2000-272174 (hereinafter referred to as "'174 publication"). In this color printer, a background color is designated through an operation panel or a command from a host PC (personal computer) so that print data is transmitted to the color printer from the host PC. Thereafter, frame memory corresponding to one page of the paper is prepared in a controller, and an operation to fill the frame memory with the designated background color is executed. Further, developed print data is overwritten in the frame memory.

When a recording medium with its color being other than white (e.g. yellow) is used, a user may create image data having a background area of which color is represented in yellow in consideration of printing the image on yellow as a ground color. In this regard, the yellow background area in the printed image may be printed in one of three patterns, which are "printing in a transparent color (i.e., no printing is performed)", "printing in white", and "printing in yellow". Further, when a color of the recording medium is blue, and the user creates image data having a background area of which color is represented in yellow, the yellow background area in the printed image may be printed in one of four patterns, which are "printing in a transparent color (i.e., no printing is performed)", "printing in white", "printing in yellow", and "printing in blue".

Thus, in general, the background area may be printed in one of three patterns, which are "printing in the color represented by the image data as it is", "printing in a transparent color", and "printing in a specific color instead of the color represented by the image data". Conventionally, however, the user has not been allowed to arbitrarily designate the printing pattern of the background color. Therefore, for example, when the user intends to print the background area, of which color is represented in yellow in the image data, in a specific color (for example, blue), the user has been required to execute an editing operation on the image data by substituting yellow as the background color into blue, and creating the print data based on the edited image data.

According to the picture processing unit disclosed in '374 publication and the image processing method disclosed in '238 patent, the user can arbitrarily designate colors and areas to be printed in the transparent color, and according to the color printer in '174 publication, the white color in the white area in the image data can be replaced into another color. Even with these techniques, however, the user are not allowed to arbitrarily designate one of the three patterns to print the background area in the image printing operation, nor to designate a plurality of the background colors so that each of the background colors can be respectively set.

SUMMARY

Aspects of the present invention are advantageous in that a print data generating apparatus and a print data generating program therefor, wherein the user can arbitrarily designate a background color of an image to be printed and a pattern to process the background color so that print data to print the background color in a desired manner on a recording medium can be created, are provided.

BRIEF DESCRIPTION OF THE ACCOMPANYING DRAWINGS

FIG. 7 shows a data configuration of a color conversion table 410 according to the embodiment of the invention.

FIG. 8 shows a data configuration of a white conversion table 420 according to the embodiment of the invention.

DETAILED DESCRIPTION

General Overview

Figure 1:
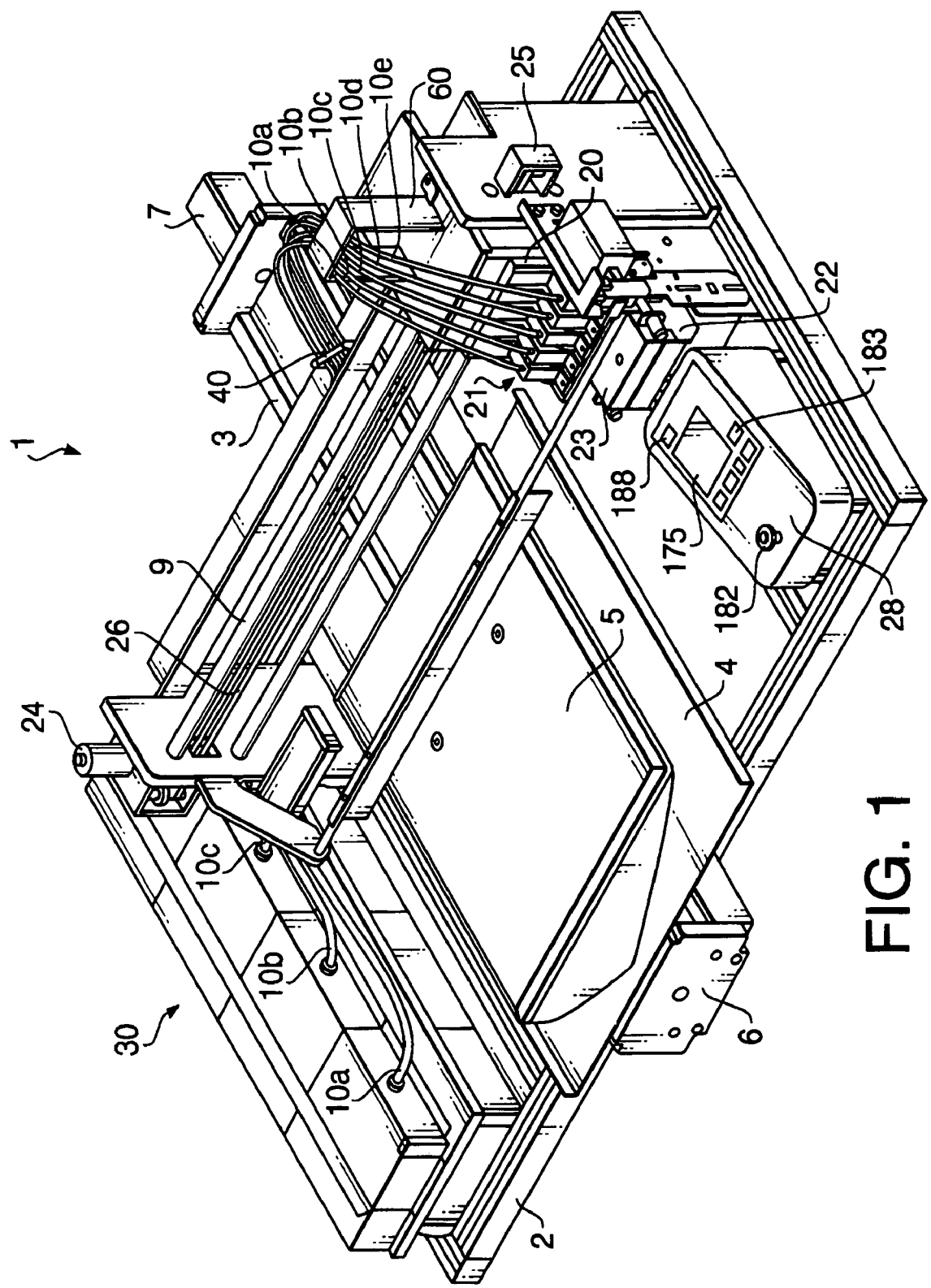
FIG. 1 is a perspective view of an overall configuration of an inkjet printer 1 according to an embodiment of the invention.

According to an aspect of the present invention, a print data generating apparatus to generate print data which is used for printing in a printing apparatus based on image data representing an image to be printed on a recording medium is provided. The print data generating apparatus comprises a background color designating system, in which at least one background color of pixels in a background area of the image to be printed is arbitrarily designated based on a feature of the recording medium, a usable color designating system, in which a color to be used to print the at least one background color of the pixels in the background area of the image designated in the background color designating system is arbitrarily designated among a plurality of color options including a transparent color and a specific color specified by a user, a color substituting system, in which color information of the at least one background color designated in the background color designating system is substituted with color information of the color designated in the usable color designating system, and a print data creating system, in which print data to be used for printing is created based on the image data wherein the color information of the at least one background color is substituted in the color substituting system with the color designated in the usable color designating system.

According to the above configuration, at least one background color of an image to be printed can be arbitrarily designated among color information of a plurality of pixels configuring the image data. When one of a plurality of color options including a transparent color and a specific color specified by the user is designated to be the color to be used for printing, the color information of the background color is substituted with color information of the designated color to be used. Therefore, the user can designate the background color and the color option of the background color to be printed, and the print data is created so that the background color can be printed in an appearance on the recording medium as the user desires.

Optionally, the color substituting system may substitute the color information of the background color with color information whereby no printing is executed when the transparent color is designated as the color to be used.

According to the above configuration, when the user designates the transparent color to be used for printing, the pixels having the color information of the background color can be effectively prevented from being printed.

Optionally, the color substituting system may substitute the color information of the background color with color information of the specific color specified by the user when the specific color is designated as the color to be used.

According to the above configuration, when the user designates the specific color to be used for printing, the pixels having the color information of the background color can be printed in the specific color.

Optionally, the plurality of color options for the usable color designating system may include a pixel color, of which color information is printed unsubstituted, and the color substituting system may maintain the color information of the at least one background color of the pixels unsubstituted when the pixel color is designated as the color to be used.

According to the above configuration, when the user designates the pixel color to be used for printing, the pixels having the color information of the background color can be printed in the color of the pixel.

Optionally, the color substituting system may maintain the color information of white as a background color of pixels in the image unsubstituted when a color other than white is designated as the background color of the pixels in the background area of the image.

According to the above configuration, when the user does not designate white as the background color, pixels having color information of white are printed in white. Therefore, the image with higher reproducibility can be obtained even when a color of the recording medium is a color other than white.

Optionally, the color substituting system may substitute the color information of white as a background color of pixels in the image with color information whereby no printing is executed when a color other than white is designated as the background color of the pixels in the background area of the image.

According to the above configuration, when the user does not designate white as the background color, pixels having color information of white are not printed at all. Therefore, a usage amount of white ink can be preferably adjusted so that the image can be printed at high speed yet low cost when a color of the recording medium is white.

Optionally, the color substituting system may substitute the color information of the background color with color information of white when white is designated as the color to be used.

According to the above configuration, when the user designates white as the color to be used for printing, the image with higher reproducibility can be obtained even when a color of the recording medium is a color other than white.

According to another aspect of the present invention, a computer usable medium comprising computer readable instructions is provided. The computer readable instructions are for controlling a computer to generate print data which is used for printing in a printing apparatus based on image data representing an image to be printed on a recording medium by executing steps of designating at least one background color of pixels in background of the image to be printed arbitrarily based on a feature of the recording medium, designating a color to be used to print the at least one background color of the pixels in a background area of the image designated in the background color designating step arbitrarily among a plurality of color options including a transparent color and a specific color specified by a user, substituting color information of the at least one background color designated in the background color designating step with color information of the color designated in the usable color designating step, and creating print data to be used for printing based on the image data wherein the color information of the at least one background color is substituted in the color information substituting step with the color designated in the usable color designating step.

According to the above configuration, the user can arbitrarily designate the background color and the color option of the background color to be printed, and the print data is created so that the background color can be printed in an appearance on the recording medium as the user desires.

Embodiment

Hereinafter, referring to accompanying drawings, a first embodiment of the present invention will be described. In the present embodiment, a known personal computer 200 (see FIG. 3), which is connected to a known inkjet printer 1 (see FIGS. 1 and 2) for fabric, generates print data for printing in the inkjet printer 1.

As shown in FIG. 1, the inkjet printer 1 includes a substantially box-shaped chassis 2 with two rails 3 aligned in parallel with a front-rear direction as indicated by an arrow at an approximate center of a bottom surface thereof. The rails 3 are supported by bases (not shown) which are positioned perpendicularly with respect to the bottom surface of the chassis 2. The rails 3 support a plate as a platen base (not shown) which is movable in the front-rear direction of the chassis along the rails 3. Further, the platen base is provided with a platen mount (not shown) that extends perpendicularly with respect to the platen base at a substantial center of the platen base. An exchangeable platen 5 is set on top of the platen mount.

The platen 5 is a substantially rectangular-shaped plate and detachably attached to the platen mount with longer sides thereof aligned in parallel with the front-rear direction of the chassis 2, and clothing fabric as a recording medium is placed on the platen 5. In a position between the platen 5 and the platen base is provided a tray 4, which is fixed to the platen mount, so that a remaining part of the fabric other than the area to be printed such as sleeves of the T-shirt is received thereby and prevented from hanging over the bottom surface of the chassis 2 when the T-shirt is set on the platen 5. A platen drive mechanism 6 includes the rails 3, along which the platen base is carried in the front-rear direction of the chassis 2 by a platen drive motor 7, as the platen motor 7 is provided at a rear end of the platen drive mechanism 6.

At an approximate center of the chassis 2 in the front-rear direction, above the platen 5, a guide rail 9 to guide a carriage 20 with an inkjet head 21 mounted is provided. In vicinity of a left-hand end of the guide rail 9, a carriage motor 24 to drive the carriage 20 is provided, while a pulley 25 is provided in vicinity of a right-hand end of the guide rail 9. Further, a carriage belt 26 is drawn between the carriage motor 24 and the pulley 25 under the guide rail 9. The carriage belt 26 is fixed to a rear surface of the carriage 20 so that the carriage 20 is reciprocated along the guide rail 9 when the carriage motor 24 is activated.

In the inkjet printer 1 according to the present embodiment, white ink, in addition to cyan ink, magenta ink, yellow ink, and black ink, is used for image printing. Therefore, five ink cartridge storage units 30, wherein ink cartridges having the inks therein are detachably attached, are provided on the left-hand side of the inkjet printer 1, and black ink, cyan ink, magenta ink, yellow ink, and white ink are contained in the ink cartridges respectively.

Each ink cartridge storage unit 30 is connected to each of the inkjet heads 21 by ink supplying tubes 10a-10e so that the inks of the five colors stored in the ink cartridges are supplied to each channel of the inkjet heads 21 passing under a guiding member 40 and a tube supporting member 60. The ink supplying tubes 10a-10e are flexible tubes which can be bent and twisted to a certain extent according to the movement of the carriage 20. The guiding member 40 holds the ink supplying tubes 10a-10e behind the carriage 20. The tube supporting member 60 holds the ink supplying tubes 10a-10e as well is provided at an upper surface of the carriage 20.

The carriage 20 is provided with the five piezoelectric inkjet heads 21. Each inkjet head 21 is provided with a plurality of (for example, 128) ejection channels (not shown) through which the ink is conveyed. Each of the channels is provided with a piezoelectric actuator (not shown), which is activated individually, to eject an ink drop downward onto the recording medium from ejection nozzles (not shown) that are open at a nozzle surface of the inkjet head 21. Thus, the inks stored in the ink cartridge storage units 30 are supplied to the inkjet heads 21 through the ink supplying tubes 10a-10e and ejected from the ejection nozzles.

At a position corresponding to the carriage 20 being carried to the right-hand end of the guide rail 9, a purge unit 22 with a suction cap 23, which can be closely attached to and separated from the nozzle surfaces. The purge unit 22 is provided with a suction pump (not shown) so that the inks remaining in the ejection nozzles can be removed therefrom when the suction cap 23 is attached to the nozzle surfaces. Further, when the inkjet printer 1 is not in a printing operation, the nozzle surfaces are covered by the suction cap 23 so that the inks in the nozzle surfaces can be prevented from being dried.

At right-hand front of the chassis 2 is provided an operation panel 28 to which the user inputs an instruction for the inkjet printer 1. The operation panel 28 includes a display 175, a print button 182, a cancel button 183, and a platen feed button 188. As the platen feed button 188 is pressed, the platen 5 is moved to a position wherein the fabric such as a T-shirt as a recording medium can be set on and removed from the platen 5. When the print button 182 is pressed by the user, a printing operation to print the print data received from the personal computer 200 is started. When the cancel button 183 is pressed during the printing operation, the printing operation is canceled.

Figure 2:
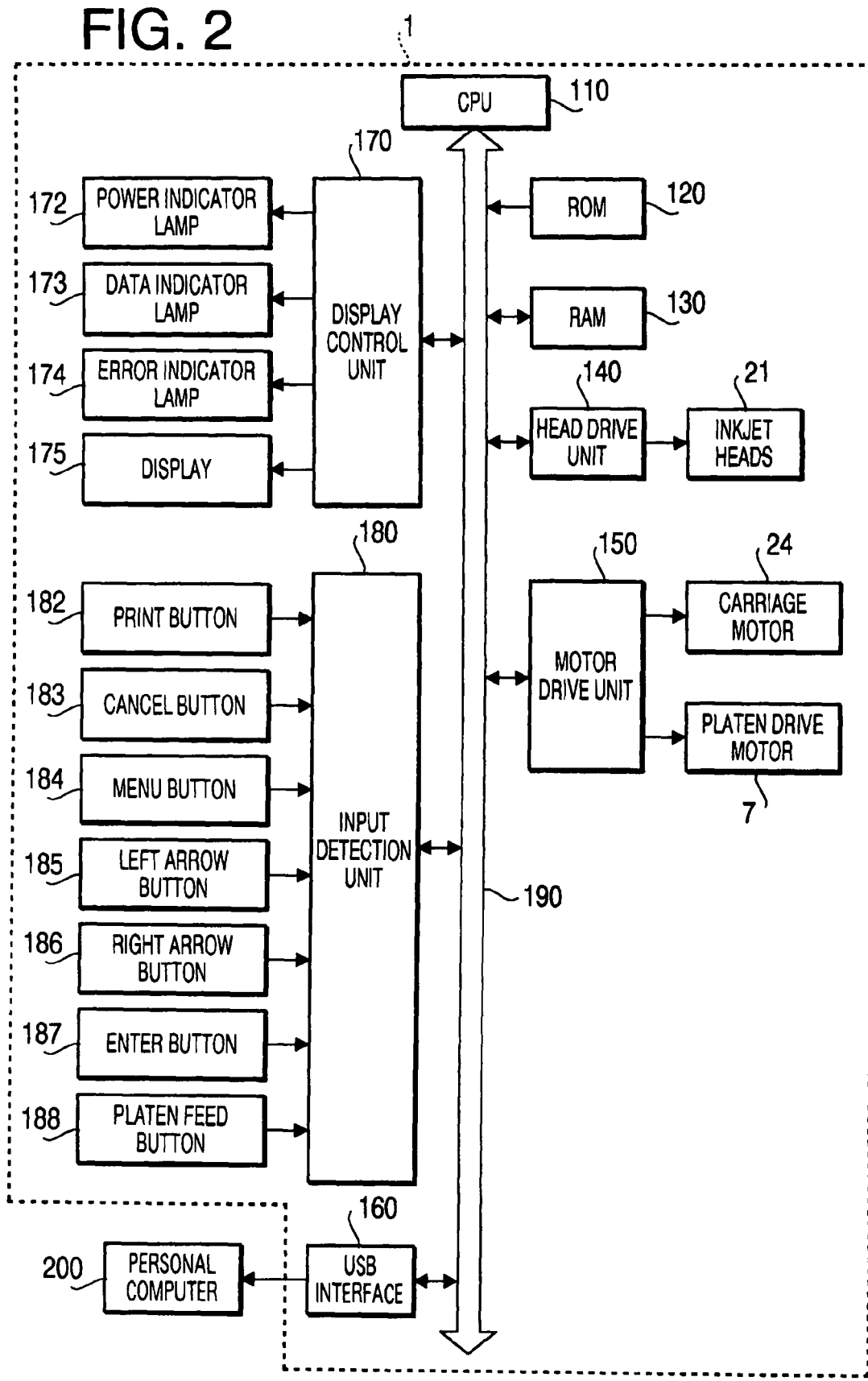
FIG. 2 is a block diagram of an electrical configuration of the inkjet printer 1 according to the embodiment of the invention.

Next, referring to FIG. 2, an electrical configuration of the inkjet printer 1 will be described. FIG. 2 is a block diagram showing the electrical configuration of the inkjet printer 1 according to the present embodiment of the invention. As shown in FIG. 2, the inkjet printer 1 is provided with a CPU 110 that controls the entire operation in the inkjet printer 1. The CPU 110 is connected with a ROM 120, wherein various information to be used in control programs executed by the CPU 110 is stored, and a RAM 130, wherein various information is temporally stored via a bus 190.

The CPU 110 is further connected with a head drive unit 140, which activates the piezoelectric actuators being provided to each channel of the inkjet head 21 and a motor drive unit 150, which controls a carriage motor 24 and a platen drive motor 7. The carriage motor 24 drives the carriage 20 having the inkjet heads 21, and the platen drive motor 7 drives a platen roller (not shown), which adjusts timing and speed to feed the platen 5 holding the fabric as a recording medium. The CPU 110 is further connected to a USB interface 160, which allows communication between the inkjet printer 1 and external devices including the personal computer 200 through a USB cable (not shown).

The operation panel 28 (see FIG. 1) is provided with the display 175, a power indicator lamp 172, a data indicator lamp 173, and an error indicator lamp 174. A display control unit 170 which executes displaying processes of these indicators is connected to the CPU 110 through the bus 190. Further, the operation panel 28 is provided with a menu button 184, a left arrow button 185, a right arrow button 186, and an Enter button 187, in addition to the print button 182, the cancel button 183, and the platen movement button 188 (see FIG. 1). An input detection unit 180 which executes detecting of these inputs is connected to the CPU 110 through the bus 190.

On the display 175, information regarding the print data such as a name and a size of the data being received from the personal computer 200 is displayed as the CPU 110 is in one of various states such as a receiving state, a print ready state, a printing state, and a print completion state, for example. Also, a menu screen (not shown) to prompt the user's input regarding various settings and details of an error when an error occurs, are displayed on the display 175. When the menu button 184 is pressed, the menu screen is displayed on the display 175, and a cursor shown on the display 175 is moved in left and right as the left arrow button 185 and the right arrow button 186 are pressed. Upon pressing the Enter button 187, an item being selected by the cursor is entered.

The ROM 120 in the inkjet printer 1 is provided with several areas including a program storing area for storing programs such as a control program for controlling an operation of the inkjet printer 1 and a print execution program for executing a printing process, and a program-related information storing area for storing information regarding settings, initial values, and data being necessary for executing the programs.

The RAM 130 in the inkjet printer 1 is provided with several areas including a received print data storing area for storing the print data received from the personal computer 200, an in-printing data storing area for storing the print data being printed, and a setting information storing area for storing various setting information.

Figure 3:
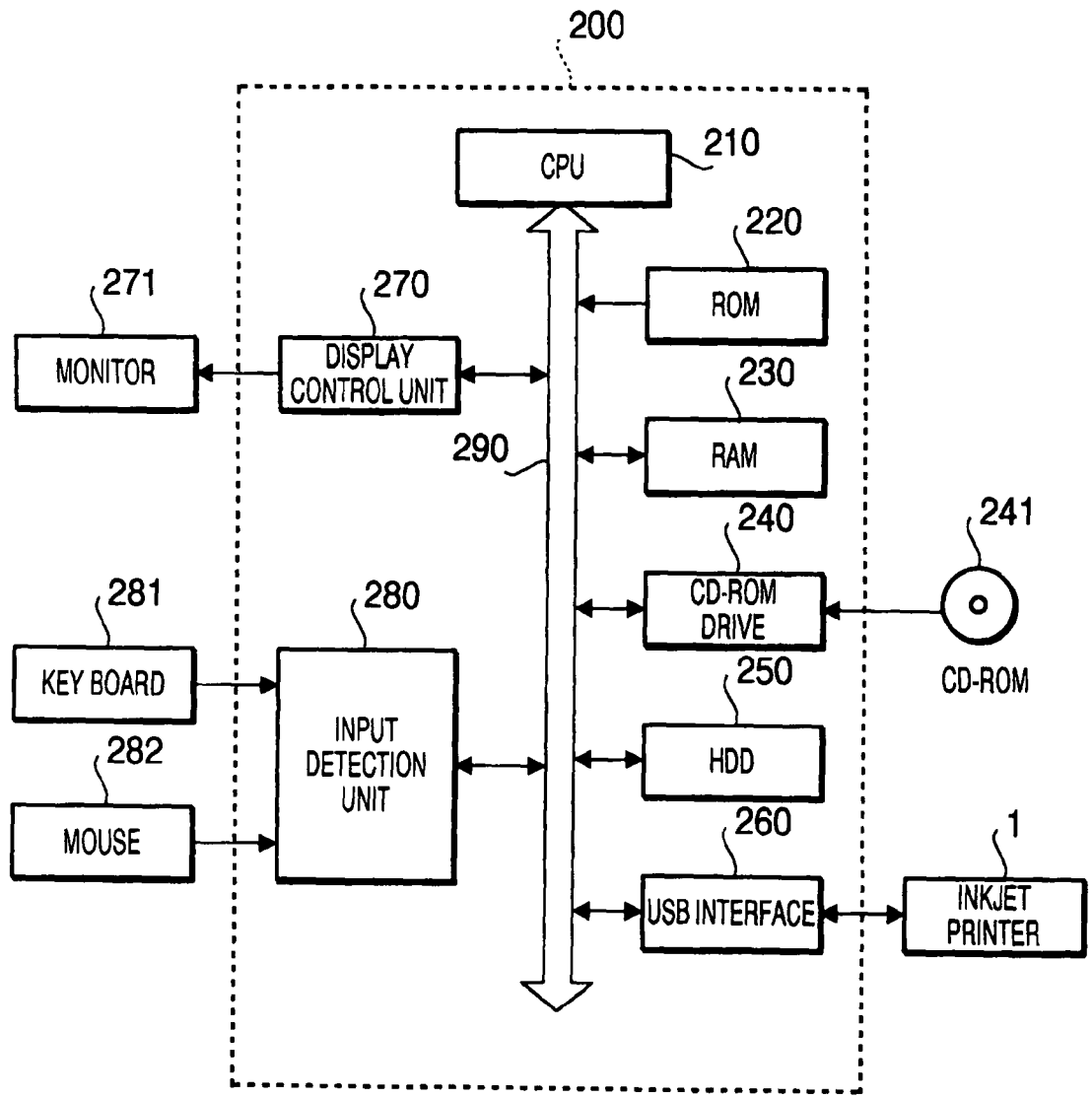
FIG. 3 is a block diagram of an electrical configuration of a personal computer 200 according to the embodiment of the invention.
Figure 4:
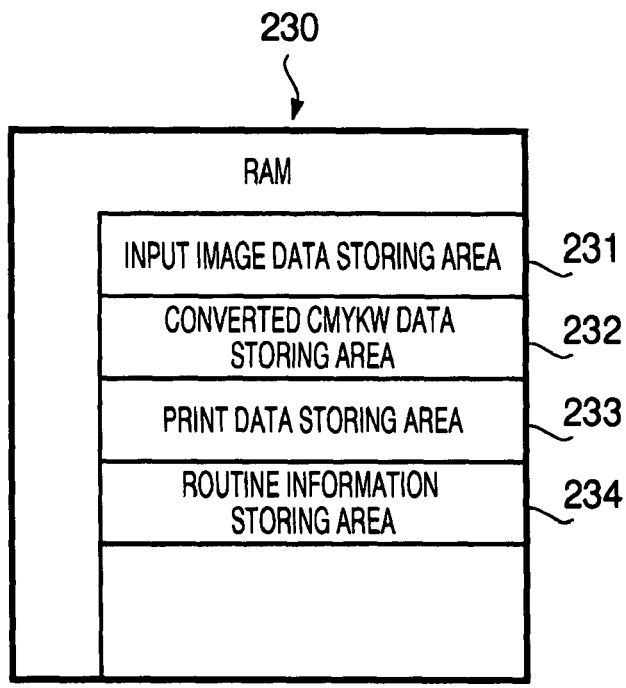
FIG. 4 is a schematic diagram of a RAM 230 in the personal computer 200 according to the embodiment of the invention.
Figure 5:
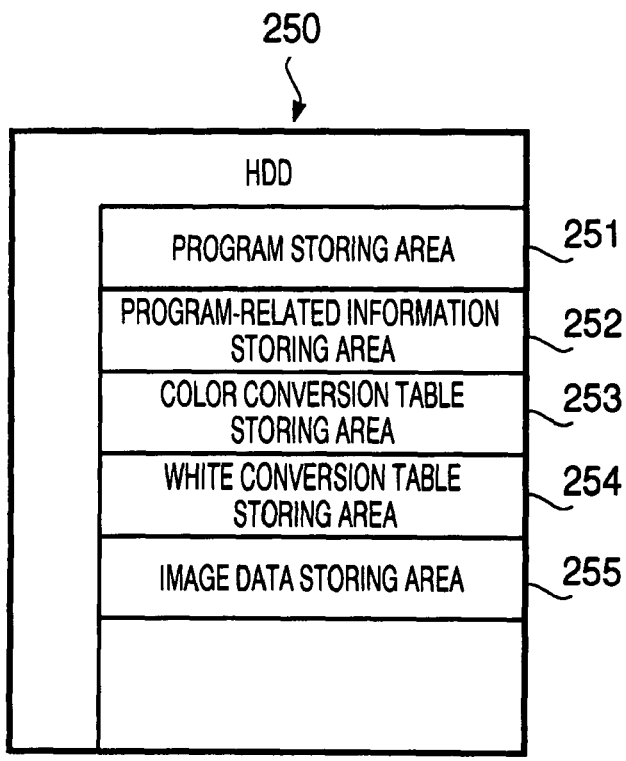
FIG. 5 is a schematic diagram of an HDD (hard disk drive) 250 in the personal computer 200 according to the embodiment of the invention.

Next, a configuration of the personal computer 200 will be described. FIG. 3 is a block diagram of an electrical configuration of the personal computer 200 according to the present embodiment of the invention. FIG. 4 is a schematic diagram of a RAM 230 in the personal computer 200 according to the present embodiment of the invention. FIG. 5 is a schematic diagram of an HDD 250 in the personal computer 200 according to the present embodiment of the invention. The personal computer 200 is connected to the inkjet printer 1 through a standardized communication cable, for example a USB. In the personal computer 200, print data is generated based on image data created by the user using various applications, and the print data is transmitted to the inkjet printer 1. A process to create the print data will be described in detail hereinafter.

As shown in FIG. 3, the personal computer 200 is provided with a CPU 210 that controls the entire operation in the personal computer 200. The CPU 210 is connected with a ROM 220, wherein various information to be used in controlling programs executed by the CPU 210 is stored, and a RAM 230, wherein various information is temporally stored via a bus 290. Further, a CD-ROM drive 240 for reading data from a CD-ROM 241 inserted therein as a storage medium of data, and the HDD 250 which is a storage unit for data, through a bus 290, are connected to the CPU 210.

The CPU 210 is further connected to a USB interface 260, which allows communication between the personal computer 200 and external devices including the inkjet printer 1 through a USB cable (not shown). The CPU 210 is furthermore connected to a display control unit 270 which executes displaying processes to display an operation screen, input devices including a keyboard 281 and a mouse 282 which are operated by the user, and an input detection unit 280 which executes detecting of these inputs. It should be noted that the personal computer 200 is also provided with other units such as a Floppy (registered trademark) disk drive, an audio input-output unit, and various interfaces.

In the CD-ROM 241, printer driver in which a print data creating program is incorporated and information regarding settings and data to be used for executing the program are stored. Such printer driver and the information are stored (copied) from the CD-ROM 241 in a program storing area 251 (see FIG. 5) and a program-related information storing area 252 (see FIG. 5) in the HDD 250, at the time of installation. It should be noted that such information as the printer driver for the personal computer 200 and the other information can be obtained in the other method than obtaining from the CD-ROM 241. For example, other recording media such as a flexible disk and an MO (magnet-optical) disk are also available. Further, the information may be obtained from a terminal on a same network by connecting the personal computer 200 to the network.

As shown in FIG. 4, the RAM 230 is provided with several areas including an input image data storing area 231 for temporarily storing input image data 310 (see FIG. 6), on which image data is based for creating the print data, a converted CMYKW data storing area 232 for storing converted CMYKW data 320 (see FIG. 6), which is converted from the input image data 310, a print data storing area 233 for storing print data 330 (see FIG. 6), which is created from the converted CMYKW data 320, and a runtime information storing area 234 for storing temporary the other data to be used during execution of other programs.

As shown in FIG. 5, the HDD 250 is provided with several areas including a program storing area 251 for storing various programs to be executed in the personal computer 200 including the printer driver, a program-related information storing area 252 for storing information regarding settings, initial values, and data necessary for executing programs, a color conversion table storing area 253 for storing a color conversion table 410 (see FIG. 6), which is for converting the input image data 310 into a color ink level (in a CMYK format), a white conversion table storing area 254 for storing a white conversion table 420 (see FIG. 6), which is for converting the input image data 310 into a white ink level (in a W format), and an image data storing area 255 for storing a plurality of pieces of image data.

In the color conversion table storing area 253, a plurality of color conversion tables 410 and a plurality of white conversion tables 420, each of which corresponds to a feature of an image to be printed by the inkjet printer 1 such as a color and a material of the recording medium used, are stored.

With the aforementioned configuration of the inkjet printer 1 according to the embodiment, as the print data transmitted from the personal computer 200 is received, the user sets a T-shirt on the platen 5 and presses the print button 182. Accordingly, the platen 5 is moved to rearward of the chassis 2 along the rails 3 by the platen driving motor 7 so that the position of the carriage 20 with respect to the platen 5 corresponds to a recording start position. Thereafter, the inkjet heads 21 eject the inks as the carriage 20 is moved from the right-hand side to the left-hand side of the chassis 2 according to a recording instruction so that recording of one line is executed. Further, the platen 5 is moved to frontward from the rearward of the chassis 2 for an amount corresponding to one line, and the inkjet heads 21 eject the inks as the carriage 20 is moved from the right-hand side to the left-hand side of the chassis 2 according to the recording instruction so that recording of the next line is executed. Subsequently, the platen 5 is moved to frontward from the rearward of the chassis 2 for the amount corresponding to another one line portion. By repeating this operation, printing the image onto the T-shirt is executed. At the end of the printing operation, the platen 5 is fed forth to a position wherein the T-shirt can be removed, thus the user removes the T-shirt which underwent the printing operation.

Hereinafter, color reproduction in the personal computer 200 and the inkjet printer 1 will be described. When a color in an area is displayed on the monitor 271 in the personal computer 200, the color of pixels configuring the area is represented in a format called sRGB format. The sRGB is an international standard of color space established by the IEC (International Electrotechnical Commission), and various PC peripherals including digital cameras, printers, and monitors perform color adjustment according to the sRGB to minimize a color difference between the inputted color and output color.

When an image is printed in a printing apparatus such as the inkjet printer 1 by ejecting the inks, a color is reproduced in a format called CMYK format, which is a method of representing colors by using four colors, which are the three primary colors (cyan, magenta, and yellow) and black, and the color is reproduced by a combination of the four values that are C value, M value, Y value, and K value. In order to print the print data represented in this format, inks in the four colors are used in the inkjet printer 1 wherein an ejecting amount of the cyan ink is determined by the C value, an ejecting amount of the magenta ink is determined by the M value, an ejecting amount of the yellow ink is determined by the Y value, and an ejecting amount of the black ink is determined by the K value.

In addition to the four inks, in the present embodiment, even when a base color of the recording medium such as a T-shirt is other than white (e.g. black and blue), in order to suitably print an image in higher reproducibility on a material surface of the recording medium, white ink is used. In this regard, an ejecting amount of the white ink is determined by a W value. Specifically, the color is reproduced in five values of the print data that are the C value, the M value, the Y value, the K value, and the W value, and image printing is executed by using the inks in these five colors.

Thus, in order to print the image based on the image data being displayed on the monitor 271 of the personal computer 200 by the inkjet printer 1, it is required to convert the image data in the sRGB format into print data in the CMYKW format. According to the present embodiment, upon executing a print data generation process (FIG. 9) by the personal computer 200, the print data in the CMYKW format is created based on the image data in sRGB format.

Figure 6:
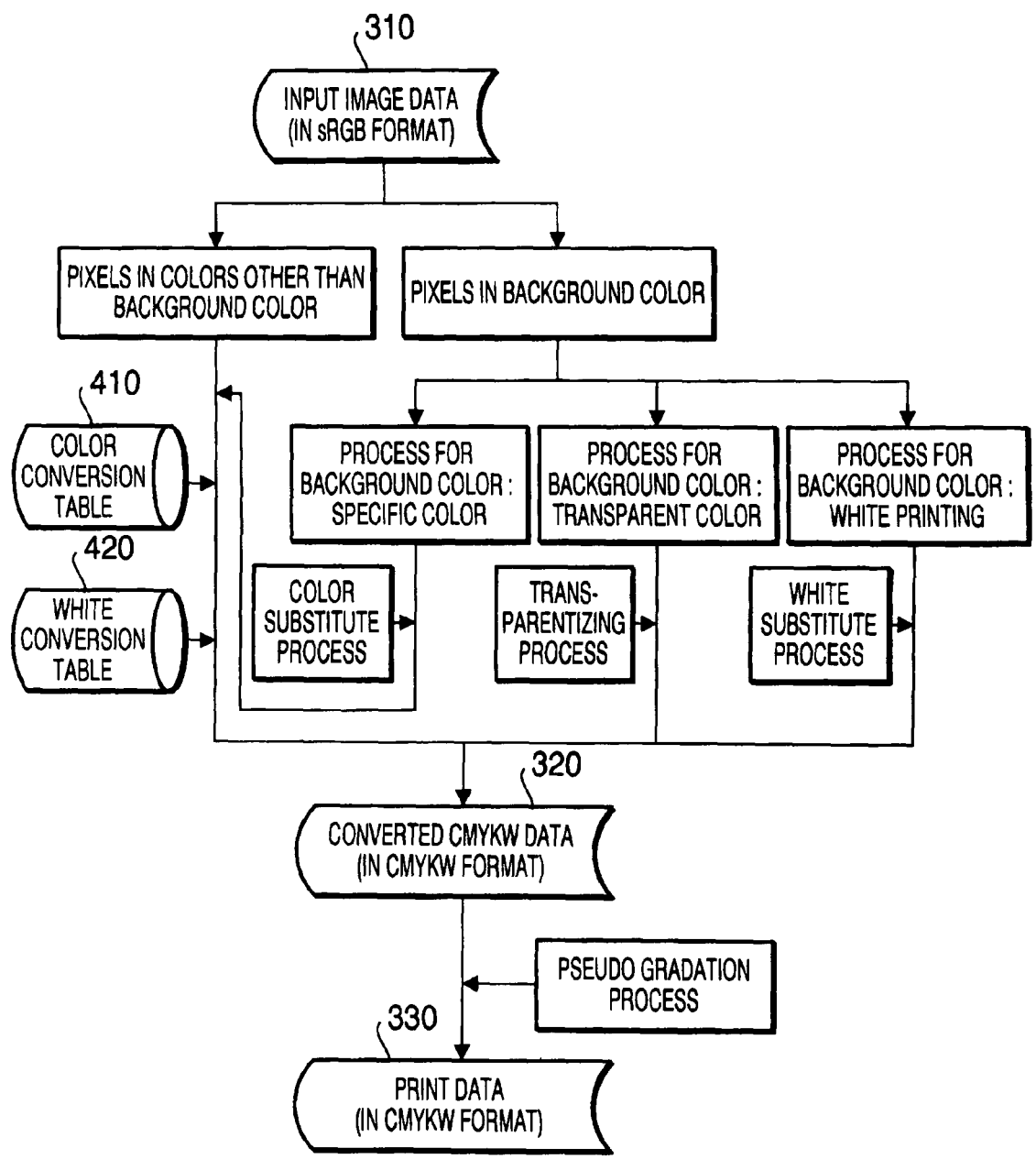
FIG. 6 shows transition of data in a print data generation process according to the embodiment of the invention.

Hereinafter, the data to be generated in the print data generation process according to the present embodiment will be described. FIG. 6 shows transition of data in the print data generation process according to the embodiment of the invention. FIG. 7 shows a data configuration of the color conversion table 410 according to the embodiment of the invention. FIG. 8 shows a data configuration of the white conversion table 420 according to the embodiment of the invention. In the present embodiment, the recording medium to be printed an image thereon is a T-shirt with a ground color of blue.

As shown in FIG. 6, basic data to create print data 330 is the input image data 310 stored in the input RGB data storing area 231 in the RAM 230. The input image data 310 is the data which is specified to be printed by the user among a plurality of pieces of image data which have been created by the user using various applications such as an application designed for creating documents and an application designed for editing graphics. Thus, the input image data 310 is saved in the image data storing area 255 of the HDD 250. Specifically, the image data according to the present embodiment is represented in 256 color scale of the image data in sRGB format.

The color ink level data in the CMYK format is created in a process such that the sRGB values of each pixel having color information which is different from color information of a color specified by the user as a background color (i.e., pixels in the other colors than the background color, hereinafter referred to as non-background color) among a plurality of pixels which compose the input image data 310 are respectively converted into the CMYK values based on the color conversion table 410, which is stored in the color conversion table storing area 253 of the HDD 250. The color conversion table 410 is a table for converting the input data in 256 color scale in the sRGB format into the output data in 256 color scale in the CMYK format. As shown in FIG. 7, each of the CMYK values is defined to correspond to each of the sRGB values respectively. Further, the sRGB values of each pixel in non-background color which composes the input image data 310 are converted into the corresponding CMYK values respectively based on the color conversion table 410. In this regard, in the color conversion table 410, a profile wherein correspondence between the CMYK values and the sRGB values are defined may be arbitrarily created based on a known conversion method.

Also, the white ink level data in W format is created in a process such that the sRGB values of each pixel having color information as the non-background color which composes the input image data 310 are converted into the W values respectively based on the white conversion table 420 stored in the white conversion table storing area 254 of the HDD 250. The white conversion table 420 is a table for converting the input data in 256 color scale in the sRGB format into the output data in 256 color scale in W format. As shown in FIG. 8, the W value is defined to correspond to each of the sRGB values respectively. Further, the sRGB values of each pixel in the non-background color which composes the input image data 310 are converted into the corresponding W value respectively based on the white conversion table 420. In this regard, in the white conversion table 420, a profile wherein correspondence between the sRGB values and the W values are defined may be arbitrarily created based on a known conversion method.

Meanwhile, the sRGB values of the pixels having the color information of the color designated by the user as the background color (i.e., pixels in the background color) among the pixels which compose the input image data 310 are converted into the CMYK values respectively according to a process for background color designated by the user. The background color can be determined by the user based on a feature such as a color and texture of the recording medium so that reproducibility of the image printed on the recording medium can be improved. In the present embodiment, the process for background color refers to designating a color to be used for printing the pixels in the background color, and the user can designate any one of "specific color", "transparent color", and "white printing" in the process.

When the specific color is designated in the process for background color, the pixels in the background color are printed in the specific color designated by the user. Specifically, a color substitute process, wherein the sRGB values of the pixels in the background color are substituted into sRGB values of the specific color designated by the user, is performed. Thereafter, the substituted sRGB values are converted into the CMYKW values based on the color conversion table 410 and the white conversion table 420 in the previously mentioned manner.

When the transparent color is designated in the process for background color, no printing is performed for the pixels in the background color. Specifically, a transparentizing process, wherein the sRGB values of the pixels in the background color are converted into CMYKW values (0, 0, 0, 0, 0), is performed. It should be noted that when the CMYKW values for a pixel are (0, 0, 0, 0, 0), no printing is performed for the pixel.

When the white printing is designated in the process for background color, the pixels in the background color are printed in white. Specifically, the sRGB values of the pixels of the background color are converted into CMYKW values (0, 0, 0, 0, 255), as a white substitute process, wherein the sRGB values of the pixels in the background color are substituted into CMYKW values (0, 0, 0, 0, 255), is performed. It should be noted that when the CMWK W values for a pixel are (0, 0, 0, 0, 255), the pixel is printed in white.

In the present embodiment, when the specific color is designated in the process for background color, and the sRGB values of the specific color designated by the user are (255, 255, 255), color conversion is executed in accordance with the color substitute process, although a result of the process is equivalent to a result of the white substitute process.

Thus, the sRGB values of the pixels in the non-background color are converted into the CMYKW values respectively based on the color conversion table 410 and the white conversion table 420. On the other hand, the pixels in the background color are converted respectively into any of the CMYKW values based on the specific color, the CMYKW values to execute no printing, and the CMYKW values to execute white printing, according to the process for background color arbitrarily designated by the user. Thereafter, the converted CMYKW data 320 in 256 color scale in the CMYKW format is stored in the converted CMYKW data storing area 232 of the RAM 230. Additionally, a pseudo gradation process is performed on the converted CMYKW data 320 so that the print data 330 in two-color scale in the CMYKW format is created and stored in the print data storing area 233 in the RAM 230. Lastly, the print data 330 is transmitted to the inkjet printer 1 so as to be used for the image printing on the T-shirt as a recording medium.

Figure 9:
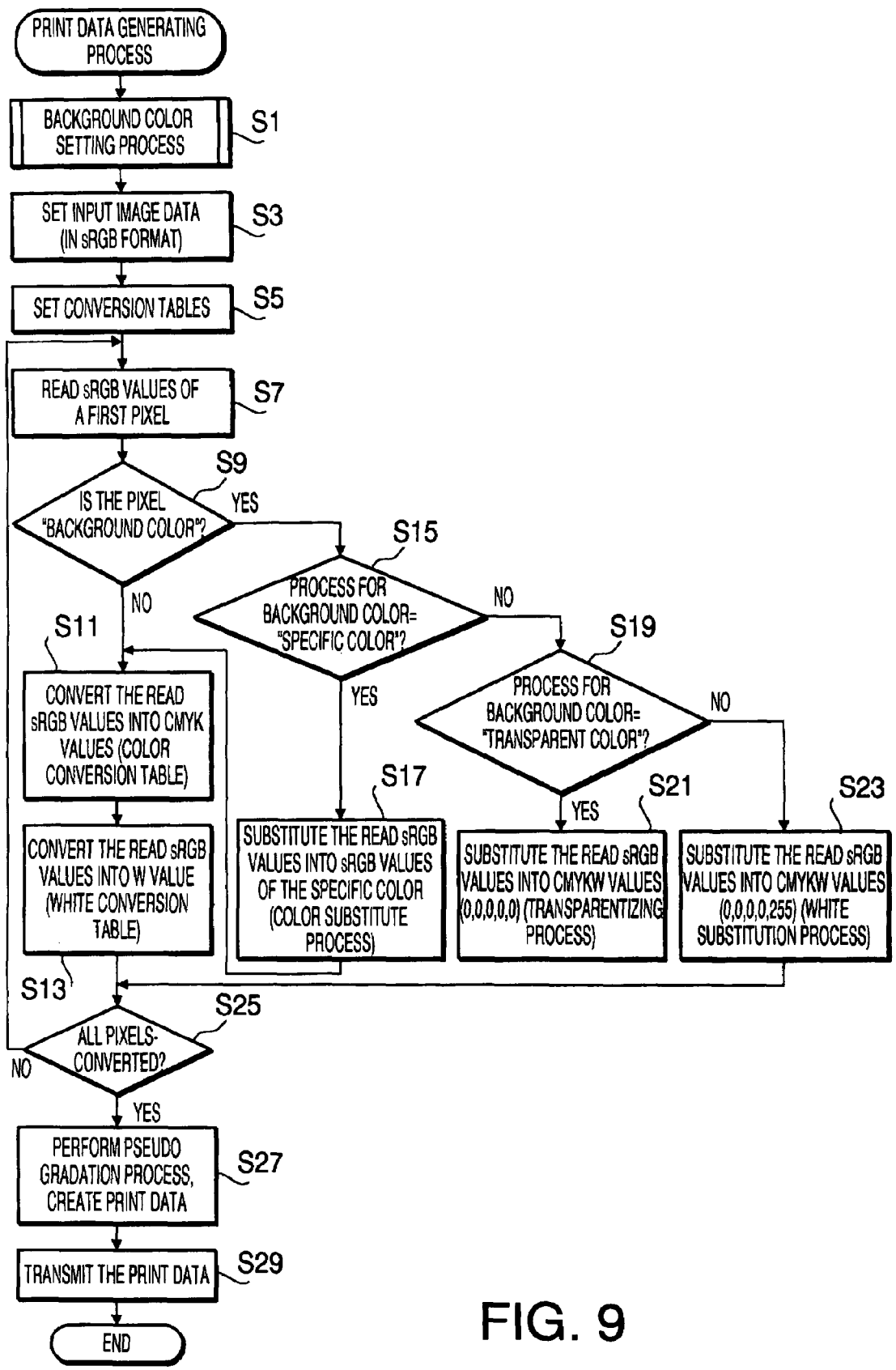
FIG. 9 is a flowchart of a print data generation process according to the embodiment of the invention.
Figure 10:
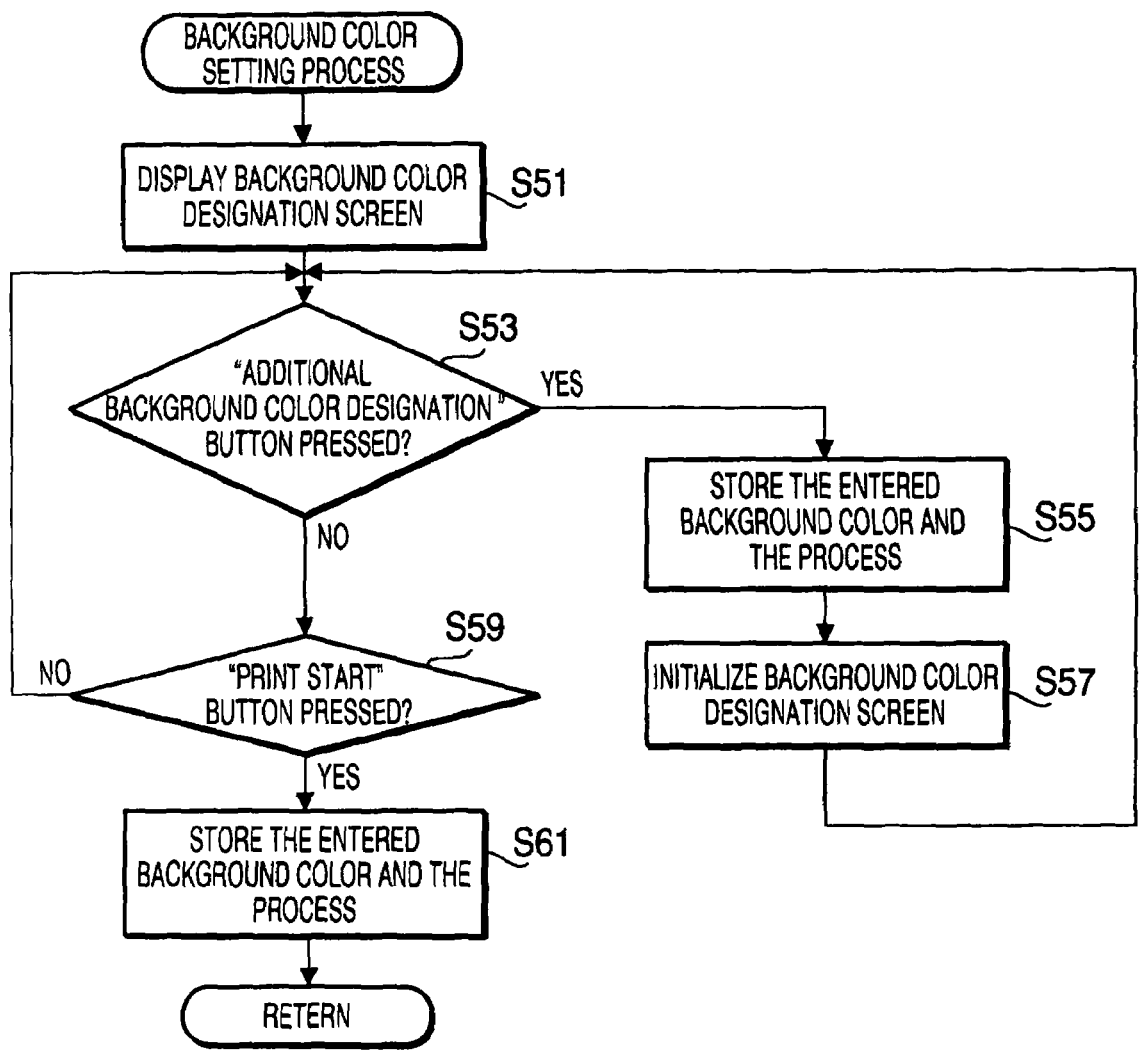
FIG. 10 is a flowchart of a background color designating process in detail according to the embodiment of the invention.
Figure 11:
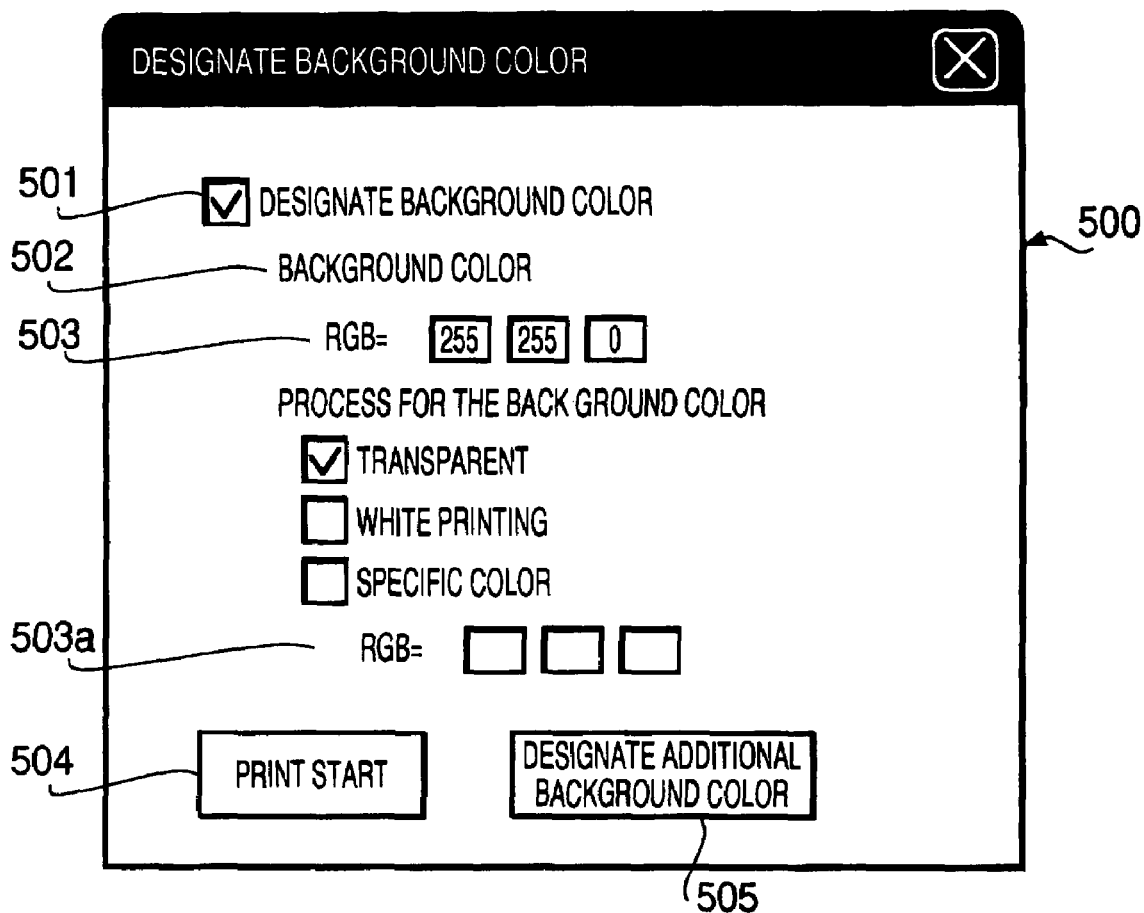
FIG. 11 shows an illustrative example of a background color designating screen 500 according to the embodiment of the invention.

Hereinafter, a print data generation process to be executed in the personal computer 200 for achieving the aforementioned data conversion will be described. FIG. 9 is a flowchart of the print data generation process according to the embodiment of the invention. FIG. 10 is a flowchart of a background color designating process in detail according to the embodiment of the invention. FIG. 11 shows an illustrative example of a background color designating screen 500 according to the embodiment of the invention. According to the present embodiment, when the user instructs to execute printing of the image data, the printer driver is activated. And the print data generation process is executed by the CPU 210 based on a print data creating program incorporated in the printer driver.

As shown in FIG. 9, in the print data generation process according to the present embodiment, first, when an instruction to print image data is given by the user, a background color setting process, wherein the user arbitrarily sets the background color and the process for the background color, is executed (S1).

As shown in FIG. 10, as the background color setting process is started, first, a background color designation screen 500, which is a dialog window for the user to set the background color and the process for the background color, is displayed on the monitor 271 (S51).

As shown in FIG. 11, the background color designation screen 500 is provided with a background color designation instruction checkbox 501 for issuing an instruction of designation of the background color, background color designation fields 502, each of which corresponds to an R value, a G value, and a B value, for designating an arbitrary background color, process for background color checkboxes 503 for selecting of the process for the background color arbitrarily designated in the background color designation fields 502, a print start button 504 for starting the creation of the print data 330, and an "additional background color designation" button 505 for designating an additional background color. In the background color designation screen 500 displayed in S51, the user may input and designate one or more background colors and processes for the background colors by using the keyboard 281 and the mouse 282.

With the above configuration in the present embodiment, the user can designate an background color to be converted arbitrarily by entering sRGB values in 256 color scale in the background color designation fields 502. Among the process for background color checkboxes 503, the user can select a pattern of the process for the background color optionally among the three patterns of "transparent color", "white printing", and "specific color". When the user designates a "specific color" by placing a checkmark in a checkbox labeled "specific color", the specific color to be used for printing the background color can be specified by entering the sRGB values of 256 color scale in RGB values specifying fields 503a provided in vicinity to the checkbox labeled "specific color". In the present embodiment, as shown in FIG. 11, the background color to be converted is designated by the sRGB values (255, 255, 0), and "transparent color" is designated to be applied the process for background.

Returning to FIG. 10, when the user presses the "additional background color designation" button 505 in the background color designation screen 500 (S53: YES), the background color (i.e., the sRGB values) entered in the background color designation fields 502 and the process for the background color checked in the process for background color checkboxes 503 as well as the sRGB values specified in the RGB values specifying fields 503a are stored in the background color setting memory area (not shown) in the RAM 230 (S55). Then, the contents inputted in the background color designation screen 500 is cleared and the screen is initialized (S57), and the process returns to S53. With this configuration, the user can set additional background colors and the processes for the background colors in the initialized background color designation screen 500. Thus, according to the present embodiment, the user can set a plurality of background colors and the processes for the background colors of the image.

When the user presses the print start button 504 in the background color designation screen 500 (S53: NO, S59: YES), similarly to S55, the background color entered in the background color designation fields 502 and the process for the background color entered in the process for background color checkboxes 503 are stored in the background color setting memory area in the RAM 230 (S61), and the process returns to the print data generation process (FIG. 9). In S53 and S59, if neither the print start button 504 nor the "additional background color designation" button 505 is pressed (S53: NO, S59: NO), the process returns to S53, and waits for a next entry from the user.

Returning to FIG. 9, the image data to be printed is set as the input RGB data 310 (S3). In S3, the image data which is specified to be printed by the user among the plurality of pieces of image data stored in the image data storing area 255 is read into the input image data storing area 231 as the input RGB data 310.

Further, the color conversion table 410 and the white conversion table 420 which are used for data conversion of the input image data 310 are set (S5). In S5, according to the feature such as a color and a material of the recording medium specified by the user, an optimal color conversion table 410 is read from the color conversion table storing area 253, and an optimal white conversion table 420 is read from the white conversion table storing area 254. Alternatively, the color conversion table 410 and the white conversion table 420 which are set in S5 may be arbitrarily specified by the user with using the keyboard 281 and the mouse 282. Thereafter, the sRGB values for a first pixel which composes the input image data 310 set in S3 are read (S7).

Next, it is judged as to whether color information of the pixel read in S7 corresponds to the background color set in the background color setting process in S1 (S9). In S9, if the color information (i.e., sRGB values in 256 color scale) of one or more background colors stored in the background color setting memory area in the RAM 230 and the color information (i.e., sRGB values in 256 color scale) of the pixel read in S7 matches, the pixel is judged to be the background color. Optionally, it may be judged that the color information of the pixel read in S7 corresponds to the background color when the color information of the read pixel is substantially close to the background color in a predetermined range. Further, when the color information of the pixel read in S7 does not correspond to the background color (S9: NO), the sRGB values read in S7 are converted into the corresponding CMYK values based on the color conversion table 410 set in S3 (S11). Thereafter, the sRGB values read in S7 are converted into the corresponding W value, based on the white conversion table 420 set in S5 (S13).

In case of the color conversion table 410 shown in FIG. 7, for example, when the sRGB values (i.e., 64, 192, 255) are read in S7, the CMYK values (i.e., 190, 21, 0, 0) are obtained in S11, and the W value (i.e., 251) is obtained in S113. Thereafter, the CMYKW values (i.e., 190, 21, 0, 0, 251) obtained in S11 and S13 are stored in a relevant pixel number field in the converted CMYKW data storing area 232.

In S9, when the pixel read in S7 corresponds to the background color (S9: YES), it is judged as to whether the process for the background color specified in the background color setting process (S1) is "specific color" (S15). In S15, specifically, it is judged as to whether the process for the background color stored in the background color setting memory area in the RAM 230 is "specific color". If the process for the background color is "specific color" (S15: YES), the color substitute process is executed so that the sRGB values of the pixel read in S7 are substituted into the sRGB values of the specific color designated by the user (S17). Thus, the sRGB values of the pixel substituted into the specific color in S7 are converted into the CMYKW values based on the color conversion table 410 and the white conversion table 420, similarly to the steps described above (S11-S13).

For example, in the background color designation screen 500, when the user designates the sRGB values (255, 255, 0) as the background color and "specific color" as the process for the background color, and further designates the sRGB values (0, 0, 255) as the specific color, the sRGB values (255, 255, 0) are read in S7. Thereafter, in S17, the pixel is substituted into sRGB values (0, 0, 255). Then, in S1 and S13, the CMYK values and the W value corresponding to the sRGB values (0, 0, 255) are obtained and stored in a relevant pixel number section in the converted CMYKW data memory area 232.

In S15, if the process for the background color is not "specific color" (S15: NO), it is judged as to whether the process for the background color set in the background color setting process (S1) is "specific color" (S19). In S19, specifically, it is judged as to whether the process for the background color stored in the background color setting memory area in the RAM 230 is "transparent color". If the process for the background color is "transparent color" (S19: YES), a transparentizing process is executed so that the sRGB values of the pixel read in S7 are converted into the CMYKW values to execute no printing (S21).

For example, in the background color designation screen 500 shown in FIG. 11, when the user designates the sRGB values (255, 255, 0) as the background color and "transparent color" as the process for the background color, as the sRGB values (255, 255, 0) are read in S7, the pixel is converted into the CMYKW values (0, 0, 0, 0, 0) in S21 and stored in a relevant pixel number section in the converted CMYKW data memory area 232.

In S19, if the process for the background color is not "transparent color" (S19: NO), it is judged that the process for the background color (i.e., the process for the background color stored in the background color setting memory area in the RAM 230) set in the background color setting process (S1) is "white printing". Therefore, the white substitution process is executed so that the sRGB values of the pixel read in S7 are converted into the CMYKW values to execute white printing (S23).

For example, in the background color designation screen 500, when the user designates the sRGB values (255, 255, 0) as the background color and "white printing" as the process for the background color, as the sRGB values (255, 255, 0) are read in S7, the pixel is converted into the CMYKW values (0, 0, 0, 0, 255) in S23 and stored in a relevant pixel number section in the converted CMYKW data memory area 232.

As described above, when the user designates "specific color" as the process for the background color and designates the sRGB values (255, 255, 255) as the specific color, the sRGB values are read in S7, and color conversion is executed in accordance with the color substitute process in S17, although a result of the process is equivalent to a result of the white substitute process in S23. Thereafter, the converted CMYKW values (0, 0, 0, 0, 255) are stored in a relevant pixel number section in the converted CMYKW data memory area 232.

Next, it is judged as to whether all the pixels which compose the input image data 310 set in S3 are converted (S25). If not (S25: NO), the process returns to S7, wherein the sRGB values for a next pixel are read, and the sRGB values of the pixel are converted into the CMYKW values (S9-S23). In this manner, the steps from S7 to S25 are executed repeatedly until data conversion of all the pixels which compose the input image data 310 are executed. Therefore, in the converted CMYKW data storing area 232, the converted CMYKW data 320 in 256 color scale in the CMYKW format is stored.

In S25, if all the pixels are converted (S25: YES), the converted CMYKW data 320 stored in the converted CMYKW data storing area 232 is converted into the print data 330 in two-color scale in the CMYKW format by a pseudo gradation process (S27). The pseudo gradation process is for binarizing the converted CMYKW data 320 in 256 color scale to down scaled print tone, and the pseudo gradation process is performed by an error diffusion method in the present embodiment. And the print data 330 created in S27 is stored in the print data storing area 233. Thereafter, the print data 330 stored in the print data storing area 233 is transmitted to the inkjet printer 1 (S29), and the process is terminated.

Meanwhile, in the inkjet printer 1 of the present embodiment, upon receiving the print data 330 transmitted from the personal computer 200, the print data 330 is stored in the received print data storing area (not shown) of the RAM 130. When the user presses the print button 182, the print data 330 is read in the in-printing data storing area (not shown), and image printing is executed on the T-shirt as a recording medium based on the print data 330.

In the present embodiment, the five the inkjet heads 21 are arranged in an order of cyan (C), magenta (M), yellow (Y), K (black), and W (white) in a direction from left to right (see FIG. 1). In a one-way printing in the printing operation, the inks are ejected in the order of W, K, Y, M, and C from left to right onto the fabric. Thus, the white ink is ejected onto the fabric ahead of the other four colors of inks (CMYK). Therefore, it may be configured such that a ground color of the fabric can be covered with the white ink before the image is formed by the colored inks (CMYK) so that the image can be printed in fine reproducibility even if the ground color of the fabric is in a color other than white.

As described above, in the print data generation process according to the present embodiment, when the user designates a background color of the image for printing (i.e., blue in the present embodiment) and the process for the background color in the background color designation screen 500 (FIG. 11), the pixels having color information other than "blue" are converted into the corresponding CMYKW values in the color conversion process (i.e., color conversion based on the color conversion table 410 and the white conversion tables 420). On the other hand, the pixels having color information of "blue" are converted into the corresponding CMYKW values based on the designated process for the background color. Therefore, in the inkjet printer 1, blue as the background color can be printed based on the print data 330 in the user's desired appearance on the recording medium. In this regard, the process for background color refers to designating a color to be used for printing the pixels in the background color, and the print data 330 is generated so that the printed appearance of the background color can be different correspondingly to the pattern of the background to be printed.

More specifically, when the user designates "specific color" as the process for the background color, the pixels having color information that corresponds to the background color are converted into the CMYKW values corresponding to a color designated by the user according to the color substitute process (for example, yellow). Therefore, based on the print data 330, a blue area in the image is printed in yellow. When the user designates "transparent color" as the process for the background color, the pixels having color information that corresponds to the background color are converted into the CMYKW values corresponding to a transparent color according to the transparentizing process. Therefore, based on the print data 330, a blue area in the image is not printed. When the user designates "white printing" as the process for the background color, the pixels having color information that corresponds to the background color are converted into the CMYKW values corresponding to white according to the white substitute process. Therefore, based on the print data 330, a blue area in the image is printed in "white".

It should be noted that the inkjet printer 1 according to the present embodiment is a printing apparatus capable of printing in white ink in contrasting density based on the white ink level (i.e., W value). Further, in case the image based on the image data contains a white pixel, and the ground color of the recording medium is in a color other than white, the white pixel contained in the image may be processed by using the function of white printing of the inkjet printer 1, which is described hereinafter.

When the user does not designate white as the background color of the image, the sRGB values of the white pixel (255, 255, 255) are converted into the corresponding CMYKW values (0, 0, 0, 0, 255) based the color conversion based on the color conversion table 410 and the white conversion tables 420 (S11, S13), as well as the pixels having color information other than the background color are converted based on the color conversion table 410 and the white conversion table 420. Accordingly, as the image is printed by the inkjet printer 1 based on the print data 330, a white area in the image is printed in white. Therefore, the white area in the image is represented in the white ink, and thus, the image can be printed in fine reproducibility, even if the ground color of the recording medium is in a color other than white.

Further, when the user does not designate white as the background color of the image, the sRGB values of the white pixel (255, 255, 255) are converted into the corresponding CMYKW values (0, 0, 0, 0, 0) with transparent color based on the color conversion table 410 and the white conversion table 420 (S11, S13). Accordingly, as the image is printed by the inkjet printer 1 based on the print data 330, a white area in the image is not printed at all. Therefore, the white area in the image is not printed, thus usage amount of the white ink can be preferably adjusted when the ground color of the recording medium is white, and thus, the image can be achieved at high speed yet low cost.

Furthermore, when the user designates white as "specific color" for the process for background color, the sRGB values of the pixel of the background color are converted into the corresponding CMYKW values of white (0, 0, 0, 0, 255) according to the white conversion process. Accordingly, based on the print data 330, the background area in the image is printed in white. Therefore, the background area in the image can represented in the white ink, and thus, the image can be printed in fine reproducibility with the background printed in white.

With the above configuration of the personal computer 200 according to the present embodiment, one or more background colors of the print image are designated arbitrarily among sRGB values of a plurality of pixels which compose the input image data 310, and any one of "transparent color", "specific color", and "white printing" can be designated arbitrarily as a usable color for printing of this background color respectively, and the print data 330 can be created by converting the sRGB values of the background color into the CMYK values and W value of the usable color, respectively. Therefore, the user can designate the background color and the process for the background color (a usable color as a color to be used) arbitrarily. Further, the user can create the print data 330 so that the background color can be printed in the user's desired appearance on the recording medium.

Furthermore, when the transparent color is designated as the process for the background color, the sRGB values of the background color are substituted into the CMYKW values, by which no printing is executed. When the specific color is designated as the process for the background color, the sRGB values of the background color are substituted into the CMYKW values of the specific color, so that the pixels corresponding to the background color are printed in the specific color. When white is designated as the process for the background color, the sRGB values of the background color are substituted into the CMYKW values of the specific color, so that the pixels corresponding to the background color can be printed in white.

Although examples of carrying out the invention have been described, those skilled in the art will appreciate that there are numerous variations and permutations of the inkjet printer that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the embodiments described above, the blue T-shirt is used as a recording medium, however, the present invention may be applied also to another recording medium such as recording paper and labels. Further, the ground color is not limited to blue, but different colors such as red and black as well as white are also available. Furthermore, the inkjet printer 1 may be replaced with another printing apparatus that records an image on a recording medium in the other recording methods, such as laser printing using toner.

According to the above embodiment, the process for the background color (the pixels designated by the user to be the background color) of the input image data 310 is designated by the user arbitrarily. However, colors other than the background color in the image data 310 can be arbitrarily set. In this case, the user may designate an arbitrary color and a process therefor in the background color setting process (S1, FIG. 10).

In the embodiments described above, the color conversion table 410 and the white conversion table 420 are used for converting image data in the sRGB format into print data in the CMYKW format, however, different data formats may be arbitrarily selected. For example, the image data may be data on the other color space such as the CMYK format and the HSV format, and the print data may be data in the other color space such the RGB format and the HSV format depending on the recording method of the printer being used. In addition, the color conversion table 410 and the white conversion table 420 may be modified as long as correspondence of data format is defined so that the image data and the print data are convertible.

Furthermore, in the above embodiment, the user designates the background color and the specific color in the sRGB format in the background color designation screen 500 (FIG. 11), however, these colors may be designated in the other color space format such as the CMYK format and the HSV format. Further, the background color and the process therefor can be designated in an arbitrary timing, and not limited within the print data generation process shown in FIG. 9. For example, the user may designate the background color and the process therefor in the background color designation screen 500 in advance before printing the image data starts.

In the above embodiment, the user selects a process for the background color arbitrarily among the three patterns of "transparent color", "white printing", and "specific color". However, other various patterns may be applied to the process for the background color. For example, the user may designate a "pixel color", wherein the color of the pixels is printed unprocessed. In this case, the sRGB values of the pixels of the background color are directly converted into the corresponding CMYKW values according to the common color conversion process. Then, based on the print data 330, the background area in the image is printed in the color of the pixel. Therefore, the pixel of the background color may be printed in the color of the pixel itself, as well as the other pixels having color information other than the background color.

What is claimed is:

1. A print data generating apparatus for generating print data that is used for printing in a printing apparatus based on image data representing an image to be printed on a recording medium, comprising:
   a background color designating system, in which color information of at least one background color of pixels to configure a background area of the image to be printed is arbitrarily designated based on a feature of the recording medium;
   a usable color designating system, in which a color to be used to print the pixels having the color information designated in the background color designating system to configure the background area of the image is arbitrarily designated among a plurality of color options including a transparent color and a specific color specified by a user;
   a color substituting system, in which the color information of the pixels designated in the background color designating system is substituted with color information of the color designated in the usable color designating system;
   a print data creating system, in which print data to be used for printing is created based on the image data, wherein the color information of the at least one background color is substituted in the color substituting system with the color designated in the usable color designating system; and
   a controller that controls the background color designating system, the usable color designating system, the color substituting system, and the print data creating system.

2. The print data generating apparatus according to claim 1, wherein the color substituting system substitutes the color information of the background color with color information whereby no printing is executed when the transparent color is designated as the color to be used.

3. The print data generating apparatus according to claim 1, wherein the color substituting system substitutes the color information of the background color with color information of the specific color specified by the user when the specific color is designated as the color to be used.

4. The print data generating apparatus according to claim 1, wherein the plurality of color options for the usable color designating system includes a pixel color, of which color information is printed unsubstituted; and
   wherein the color substituting system maintains the color information of the at least one background color of the pixels unsubstituted when the pixel color is designated as the color to be used.

5. The print data generating apparatus according to claim 1, wherein the color substituting system maintains the color information of white as the background color of pixels in the image unsubstituted when a color other than white is designated as the background color of the pixels in the background area of the image.

6. The print data generating apparatus according to claim 1, wherein the color substituting system substitutes the color information of white as the background color of pixels in the image with color information whereby no printing is executed when a color other than white is designated as the background color of the pixels in the background area of the image.

7. The print data generating apparatus according to claim 1, wherein the color substituting system substitutes the color information of the background color with color information of white when white is designated as the color to be used.

8. The print data generating apparatus according to claim 1, further comprising:
   a white conversion system to convert color information of undesignated pixels, which are eliminated from designation of the background color designating system, into white pixels to have color information of white so that the undesignated pixels can be preferentially formed in white prior to colors other than the designated color and white,
   wherein the print data creating system creates the print data based on the color information of the pixels substituted by the color substituting system and the color information of the pixels converted by the white conversion system.

9. A non-transitory computer usable medium comprising computer readable instructions for controlling a computer to generate print data that is used for printing in a printing apparatus based on image data representing an image to be printed on a recording medium by executing steps of:
   designating color information of at least one background color of pixels to configure a background area of the image to be printed arbitrarily based on a feature of the recording medium;
   designating a color to be used to print the pixels having the color information designated in the step of designating color information, arbitrarily among a plurality of color options including a transparent color and a specific color specified by a user, to configure the background area of the image designated in the step of designating color information;
   substituting the color information of the pixels designated in the step of designating color information with color information of the color designated in the usable color designating step; and
   creating print data to be used for printing based on the image data, wherein the color information of the at least one background color is substituted in the color information substituting step with the color designated in the usable color designating step.

\* \* \* \* \*